(12) United States Patent
Rydsmo et al.

(10) Patent No.: US 9,656,638 B2
(45) Date of Patent: May 23, 2017

(54) VEHICLE LOW PRESSURE BRAKE ARRANGEMENT

(71) Applicant: AUTOLIV DEVELOPMENT AB, Vårgårda (SE)

(72) Inventors: Erik Rydsmo, Sollebrunn (SE); Yngve Håland, Falsterbo (SE); Christian Svensson, Vårgårda (SE); Dan Bråse, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/783,141

(22) PCT Filed: Apr. 10, 2013

(86) PCT No.: PCT/SE2013/050383
§ 371 (c)(1),
(2) Date: Oct. 8, 2015

(87) PCT Pub. No.: WO2014/168529
PCT Pub. Date: Oct. 16, 2014

(65) Prior Publication Data
US 2016/0052493 A1    Feb. 25, 2016

(51) Int. Cl.
*B60T 1/14*    (2006.01)
*B60T 3/00*    (2006.01)
*F16D 63/00*   (2006.01)

(52) U.S. Cl.
CPC  *B60T 1/14* (2013.01); *B60T 3/00* (2013.01); *F16D 63/008* (2013.01)

(58) Field of Classification Search
CPC .......... B60T 1/16; B60T 17/46; B60T 17/046; B60T 1/14
See application file for complete search history.

(56) References Cited

U.S. PATENT DOCUMENTS 2,937,719 A * 5/1960 Aikman ................ B60T 8/246
                                             188/181 A
3,116,897 A * 1/1964 Theed ................... B60V 3/08
                                             180/125

(Continued)

FOREIGN PATENT DOCUMENTS

DE   2901035 A1   7/1980
DE   3025388 A1   1/1982

(Continued)

OTHER PUBLICATIONS

International Search Report and Written Opinion of the ISA, ISA/SE, Stockholm, mailed Jan. 8, 2014.

*Primary Examiner* — Bradley King
(74) *Attorney, Agent, or Firm* — Stephen T. Olson; Harness, Dickey & Pierce, P.L.C.

(57) ABSTRACT

A vehicle braking arrangement includes a braking plate connected to a vehicle by a link arrangement. The braking plate is movable from a rest position to a braking position where contact is made with the ground, and includes a sealing rim arranged to at least partially contact the ground such that an at least partly enclosed volume is formed. The vehicle braking arrangement includes a low pressure container connected to the volume via a valve assembly. Air pressure in the low pressure container is below the air pressure of ambient air in the rest position of the braking plate. The valve assembly is arranged to be opened when the braking plate is in the braking position such that the pressure is lowered in the volume and the braking plate is pressed against the ground by a conferred pressure difference between air outside the volume and air in the volume.

8 Claims, 8 Drawing Sheets

(56) References Cited

U.S. PATENT DOCUMENTS

| | | | | |
|---|---|---|---|---|
| 3,167,154 | A | * | 1/1965 | Salvetti ............... B60T 1/14 188/5 |
| 3,799,293 | A | * | 3/1974 | Howells ............... B60T 1/14 188/5 |
| 4,044,862 | A | | 8/1977 | Savarimuthu |
| 4,317,507 | A | * | 3/1982 | McMillan ............. B60T 1/14 188/2 R |
| 4,896,749 | A | * | 1/1990 | Walker ................ B60T 1/14 180/164 |
| 8,356,685 | B2 | | 1/2013 | Baumann |
| 2011/0017538 | A1 | | 1/2011 | Baumann |
| 2011/0198161 | A1 | * | 8/2011 | Lomazzo ............. B60T 1/14 188/5 |

FOREIGN PATENT DOCUMENTS

| | | |
|---|---|---|
| DE | 3403636 A1 | 8/1985 |
| JP | H01-262238 A | 10/1989 |
| WO | WO-03020560 A1 | 3/2003 |

* cited by examiner

VEHICLE LOW PRESSURE BRAKE ARRANGEMENT

CROSS REFERENCE TO RELATED APPLICATIONS

This application is a 371 U.S. National Stage of International Application No. PCT/SE2013/050383, filed Apr. 10, 2013 and published in English as WO 2014/168529 A1 on Oct. 16, 2014. The entire disclosures of the above application are incorporated herein by reference.

DESCRIPTION OF THE INVENTION

The present invention relates to a vehicle braking arrangement comprising a braking plate and a link arrangement arranged to connect the braking plate to a vehicle. The braking plate 7 is movable from a rest position with a certain ground clearance to a braking position where contact is made with the ground. The braking plate further comprises a sealing rim running circumferentially and being arranged to at least partially contact the ground in the braking position, such that an at least partly enclosed volume then is formed between the braking plate and the ground.

In many traffic situations it is desired to acquire an enhanced braking effect, for example at collision situations and when the road grip is lost. One way to achieve an enhanced braking effect is described in U.S. Pat. No. 8,356,685, where a braking plate may be lowered. When lowered, a vacuum chamber of the plate faces the road, the vacuum chamber being evacuated such that a retaining function is obtained by the plate being pressed against the road due to the lowered pressure in the vacuum chamber. The lowered pressure is obtained by means of a gas generator acting on a so-called Venturi tube.

However, for such an arrangement, the time between activation of the braking plate and the evacuation is too long for acquiring a braking effect in time. It is also likely that the pressure fall will be insufficient for obtaining a suitable braking effect whatsoever.

It is therefore an object of the present invention to provide an emergency braking arrangement where a braking plate may be lowered to the road and where a volume formed between the plate and the road may be subject to a lowered pressure such that the plate is pressed towards the road. In particular, the time for lowering the pressure should be sufficient for obtaining a suitable braking effect, and the lowering of the pressure should be more rapidly performed than in prior arrangements of this kind.

Said object is achieved by means of a vehicle braking arrangement comprising a braking plate and a link arrangement arranged to connect the braking plate to a vehicle. The braking plate 7 is movable from a rest position with a certain ground clearance to a braking position where contact is made with the ground. The braking plate further comprises a sealing rim running circumferentially and being arranged to at least partially contact the ground in the braking position, such that an at least partly enclosed volume then is formed between the braking plate and the ground.

The vehicle braking arrangement further comprises a low pressure container that is fluidly connected to the volume via a valve assembly. The air pressure in the low pressure container is below the air pressure of ambient air when the braking plate is in its rest position. The valve assembly is arranged to be opened when the braking plate is in the braking position such that the pressure is lowered in the volume and the braking plate is pressed against the ground by a conferred pressure difference between air outside the volume and air in the volume.

According to an example, the valve assembly comprises a trigger pin, at least one locking pin, a piston and a housing, the piston being co-axially arranged in the housing. The housing comprises at least one aperture that connects the low pressure container to the interior of the housing. The piston is locked in sealing engagement with the housing by said locking pin. The trigger pin is arranged to release the piston by acting on said locking pin when the trigger pin is pressed against the ground, the released piston allowing a fluid connection between the volume and the low pressure container to be established.

According to another example, the low pressure container is connected to a supporting arrangement for maintaining a low pressure after an at least partial pressurization of the low pressure container. The supporting arrangement may comprise a braking system.

Other examples are evident from the dependent claims.

A number of advantages are obtained by means of the present invention. Mainly, the time for lowering the pressure is sufficient for obtaining a suitable braking effect, and the lowering of the pressure is more rapidly performed than in prior arrangements of this kind.

BRIEF DESCRIPTION OF THE DRAWINGS

The present invention will now be described more in detail with reference to the appended drawings, where.

DETAILED DESCRIPTION

Figure 1:
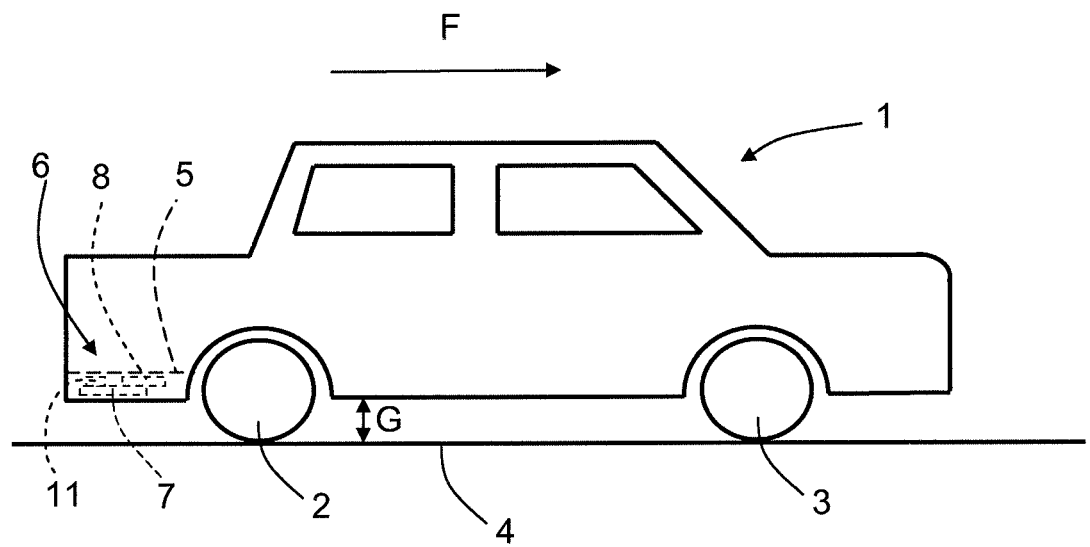
FIG. 1 shows a schematic side view of a vehicle during normal running.

With reference to FIG. 1, showing a side view of a vehicle 1, where the vehicle 1 comprises wheels 2, 3 which are in contact with the ground 4 during normal running. Here, the vehicle 1 is assumed to be running in a forward direction F. At the rear of the vehicle 1, attached to a bottom floor 5, an emergency braking system 6 is arranged.

Figure 2:
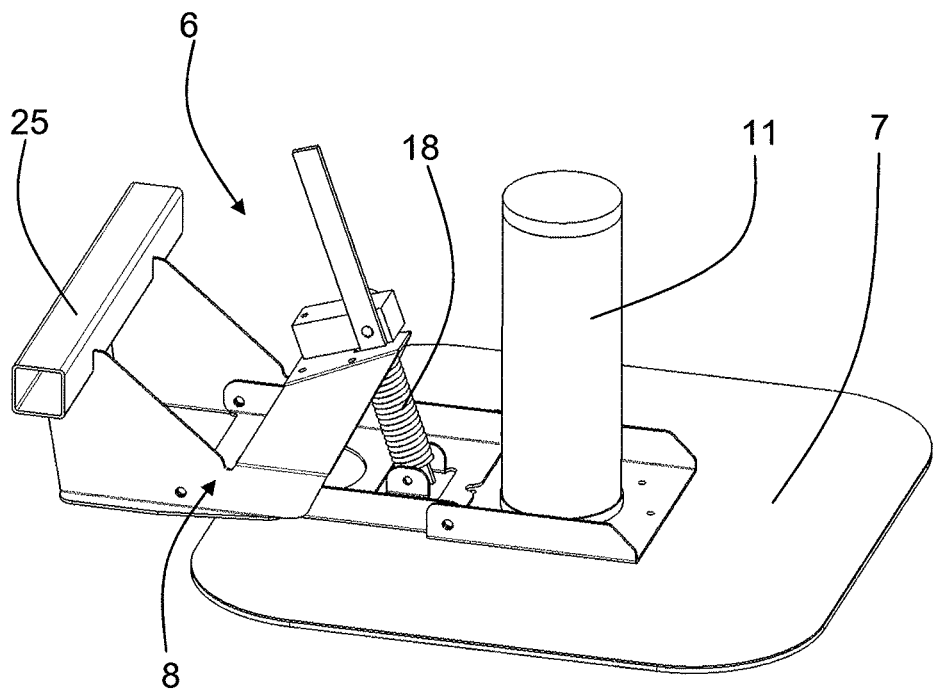
FIG. 2 shows a top perspective view of a vehicle braking arrangement according to the present invention in a normal running position.

Also with reference to FIG. 2, showing the emergency braking system 6 more in detail in its normal running position, the emergency braking system 6 comprises a braking plate 7 connected to the bottom floor 5 by means of a link arm 8 which is pre-tensioned by a spring device 18. As shown in FIG. 1, the braking plate is maintained in a rest position during normal running conditions, more or less obscured by the outer body of the vehicle 1, and preferably arranged to not disturb the vehicle's normal ground clearance G. The link arm 8 comprises a beam 25 which is attached to the bottom floor 5.

Figure 3:
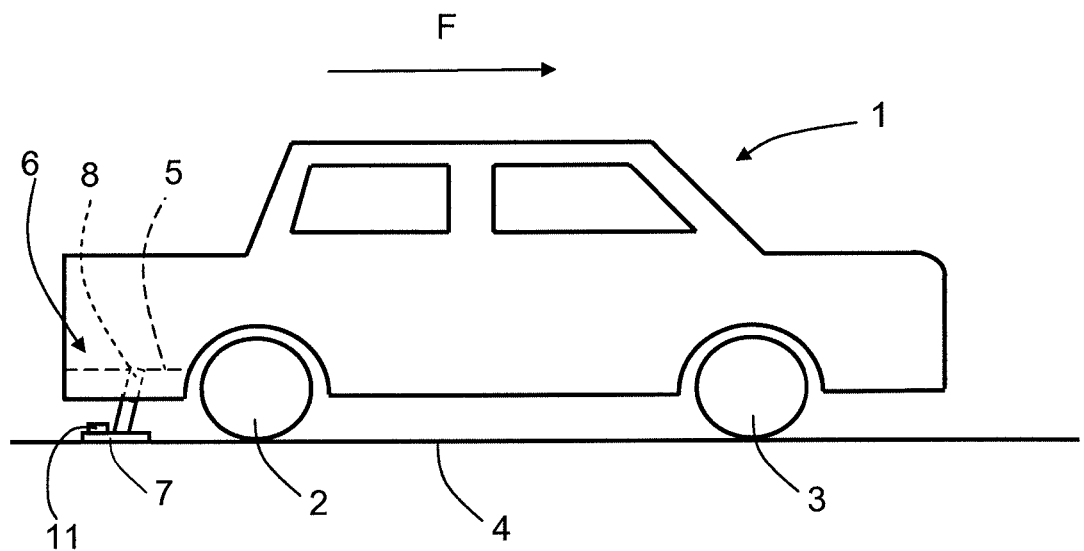
FIG. 3 shows a schematic side view of a vehicle during use of the vehicle braking arrangement according to the present invention.
Figure 4:
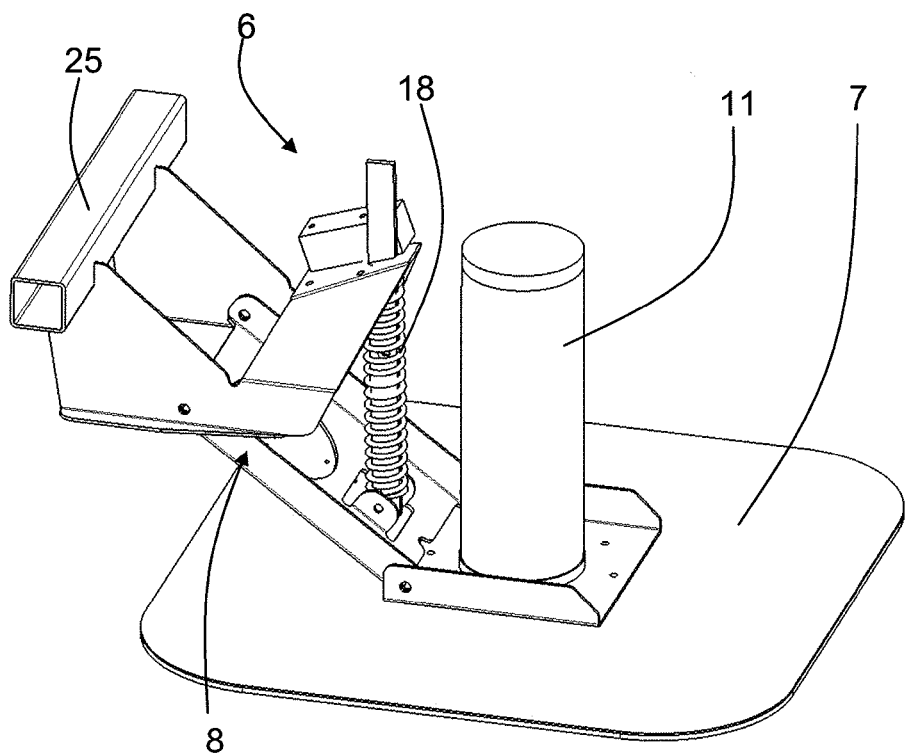
FIG. 4 shows a top perspective view of a vehicle braking arrangement according to the present invention in a braking position.

With reference to FIG. 3 and FIG. 4, an emergency situation has been detected, and additional braking is required. FIG. 3 and FIG. 4 corresponds to FIG. 1 and FIG. 2, but here the emergency braking system 6 is shown with the braking plate 7 in the braking position. The link arm has been released such that a rapid displacement of the braking plate 7 to a braking position has been performed. In the braking position, the braking plate is in contact with the ground 4.

Figure 5:
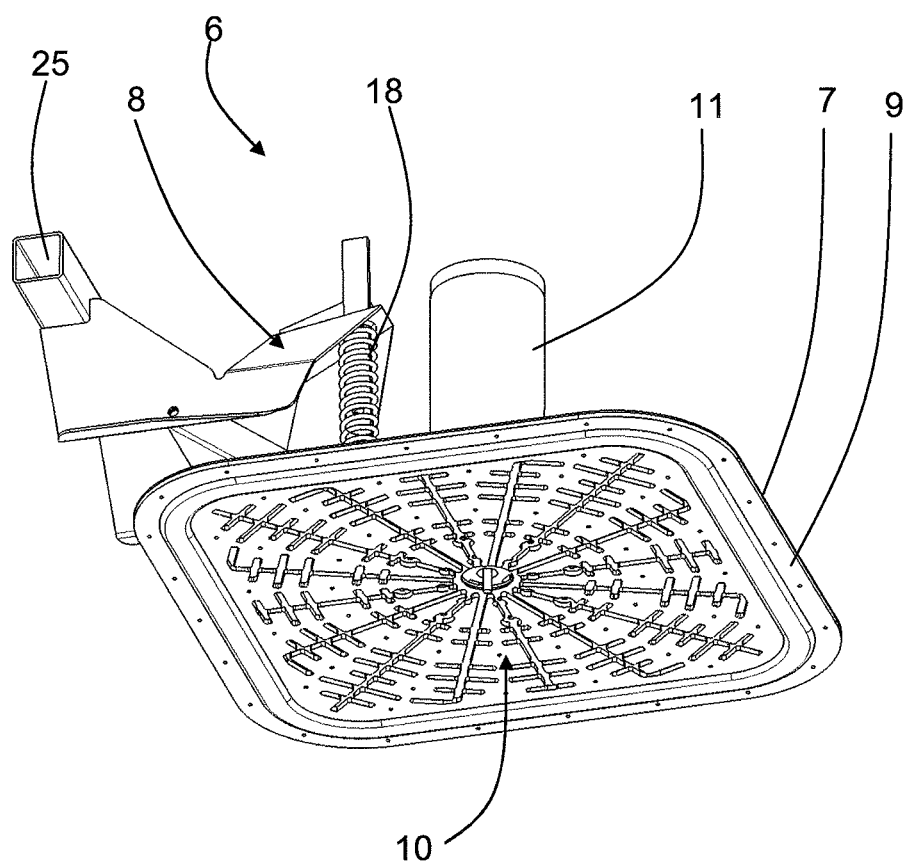
FIG. 5 shows a bottom perspective view of a vehicle braking arrangement according to the present invention.
Figure 6:
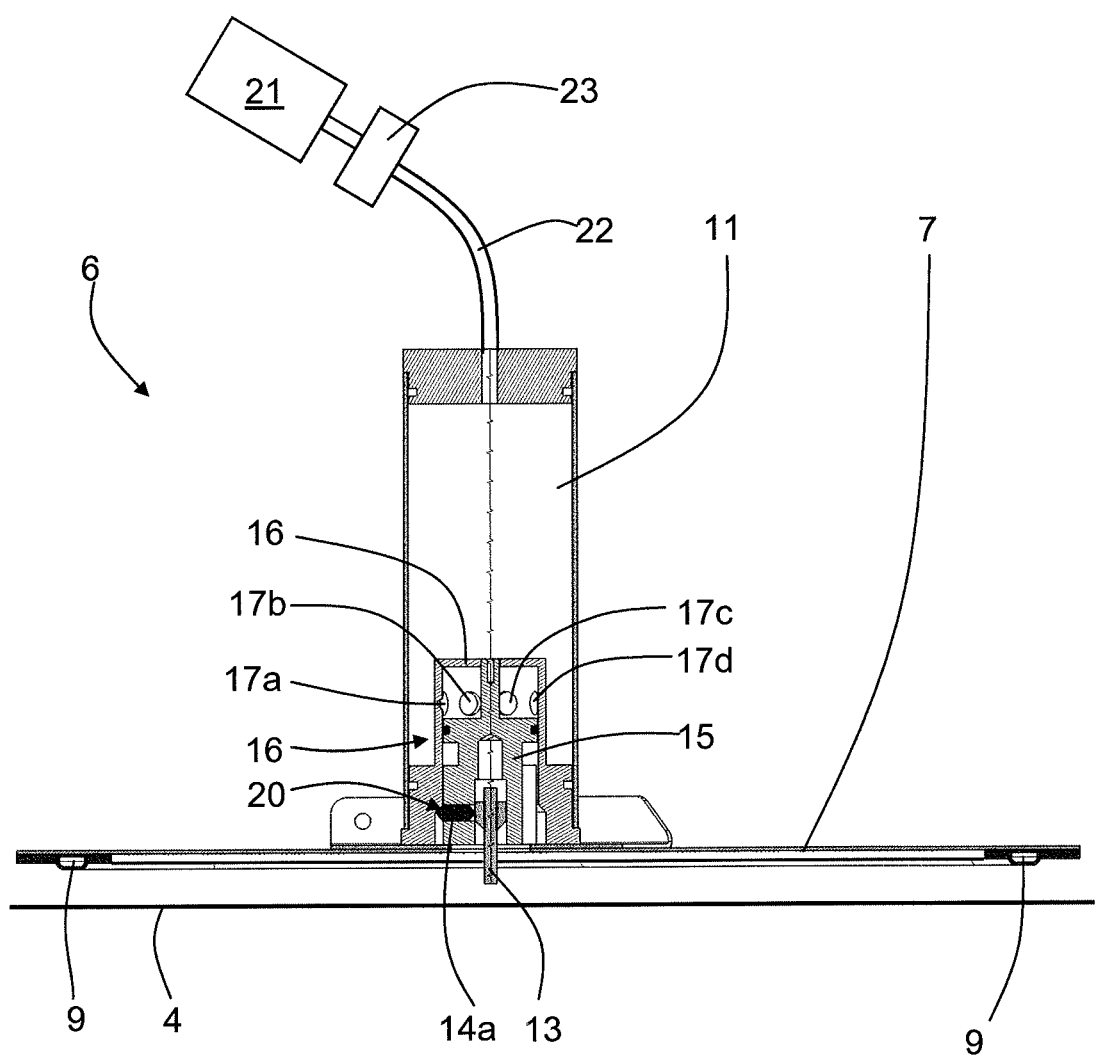
FIG. 6 shows a sectional side view of the of the vehicle braking arrangement a moment before meeting the ground.
Figure 7:
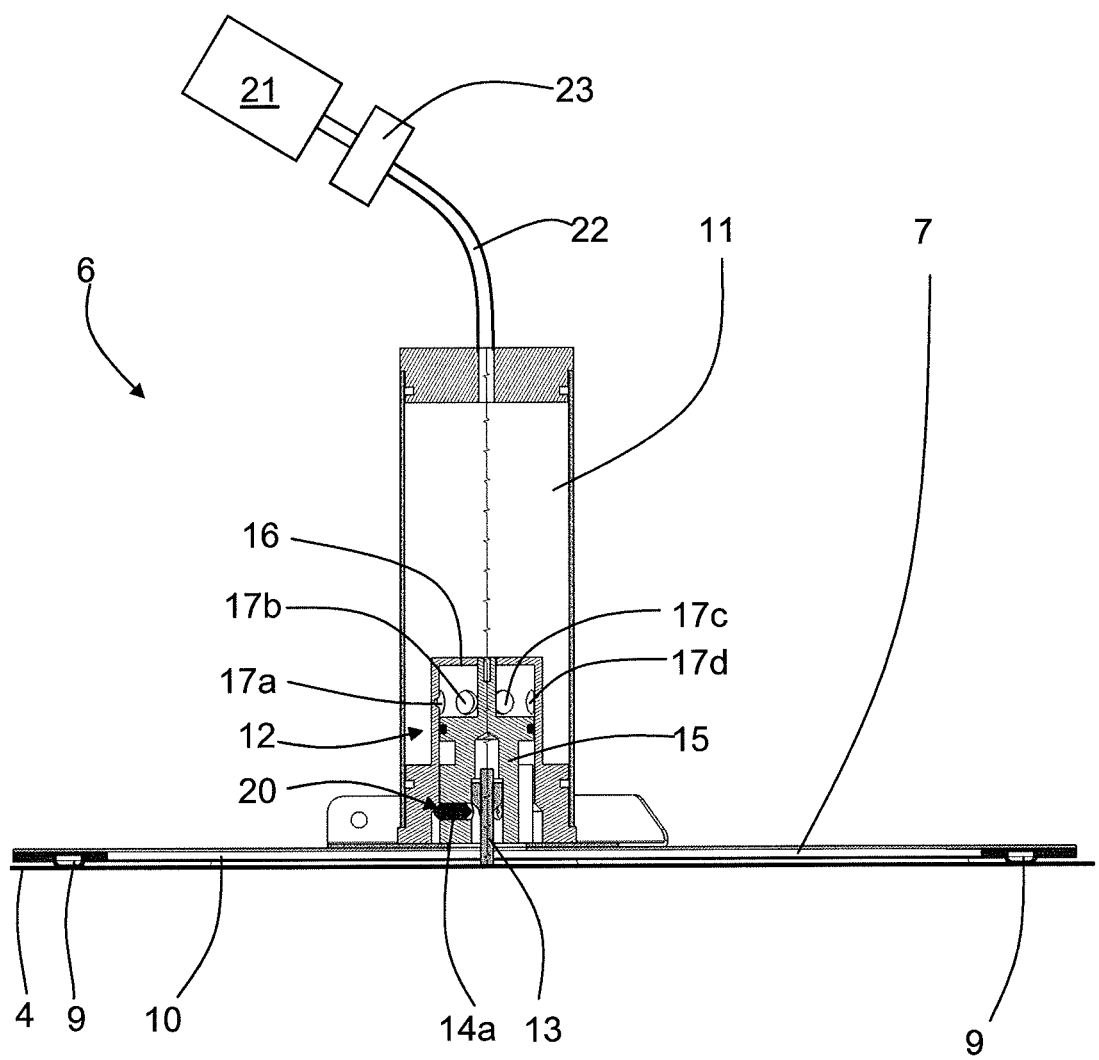
FIG. 7 shows a sectional side view of the vehicle braking arrangement at the moment the braking plate meets the ground.

FIG. 5 shows a bottom view of the emergency braking system 6, FIG. 6 shows a sectional side view of the emergency braking system 6 a moment before the braking plate 7 meets the ground 4, and FIG. 7 shows a sectional side view of the emergency braking system 6 at the moment the braking plate 7 meets the ground 4.

As shown in FIG. 5, FIG. 6 and FIG. 7, the braking plate comprises a sealing rim 9, running circumferentially and providing a sealing between the braking plate 7 and the ground 4. As evident from FIG. 7, a volume 10 is formed in the braking plate 7. The enclosed volume 10 is formed between the braking plate 7 and the ground 4, when the braking plate is in the braking position. The volume 10 may not be completely enclosed due to leakage in the sealing rim 9, for example due to unevenesses in the surface of the ground 4.

According to the present invention, the emergency braking system 6 comprises a low pressure container 11 that is fluidly connected to the volume 10 via a valve assembly 12, where the air pressure in the low pressure container 11 is below the air pressure of ambient air when the emergency braking system 6 is in its normal running position. When the valve assembly 12 is opened, the pressure is rapidly lowered in the volume 10, such that the braking plate 7 is pressed against the ground 4. In order to obtain this effect, the air pressure in the low pressure container 11 is initially much lower then the air pressure of ambient air, preferably essentially vacuum. The braking plate 7 is pressed against the ground 4 such that a retaining force between the braking plate 7 and the ground 4 is obtained. This results in a braking force between the braking plate 7 and the ground 4. In order to enhance the braking effect, the braking plate 7 may comprise high friction components such as rubber pads.

A sufficiently low pressure may be maintained up to a number of seconds, during which a braking effect is achieved.

In the following, a more detailed description of the emergency braking system 6 will be described.

Figure 8:
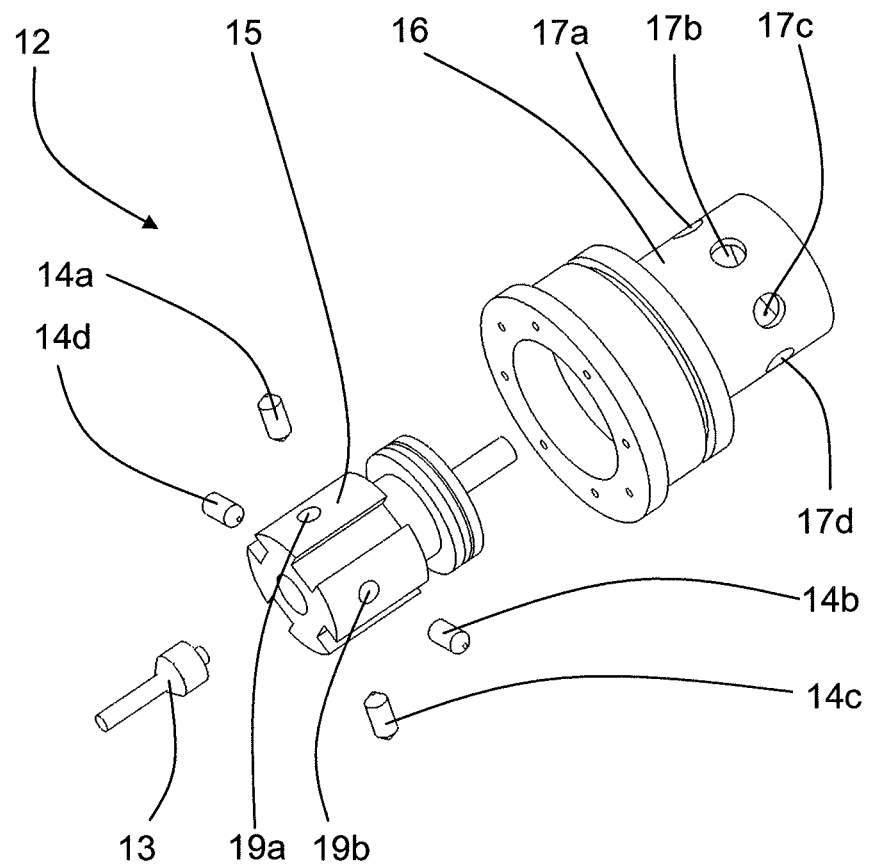
FIG. 8 shows an exploded view of the valve assembly.

With reference to FIG. 6, FIG. 7 and FIG. 8, where FIG. 8 is showing an exploded view of the valve assembly 12 and the low pressure container 11, the valve assembly 12 constitutes an interface between the volume 10 and the low pressure container 11. The valve assembly 12 comprises a trigger pin 13, four locking pins 14a, 14b, 14c, 14d, a piston 15 and a housing 16, the piston 15 being co-axially arranged in the housing 16. The housing 16 comprises circumferentially arranged apertures 17a, 17b, 17c, 17d that connect the low pressure container 11 to the interior of the housing 16.

As shown in FIG. 6, the trigger pin 13 blocks the locking pins 14a, 14b, 14c, 14d, the piston 15 being in sealing engagement with the housing 16. The locking pins 14a, 14b, 14c, 14d lock the piston 15 to the housing 16 in an axial direction, the locking pins 14a, 14b, 14c, 14d running in corresponding apertures 19a, 19b (only two of four shown in FIG. 8) in the piston 15, and arranged to be locking against a circumferentially running shoulder edge 20 in the housing 16.

In FIG. 7, the braking plate 7 has reached the ground 4, and the trigger pin 13 has been pressed against the ground depressed into the piston 15. In this position, the locking pins 14a, 14b, 14c, 14d are not locked by the trigger pin 13 anymore, but remain in their position at this instant.

Figure 9:
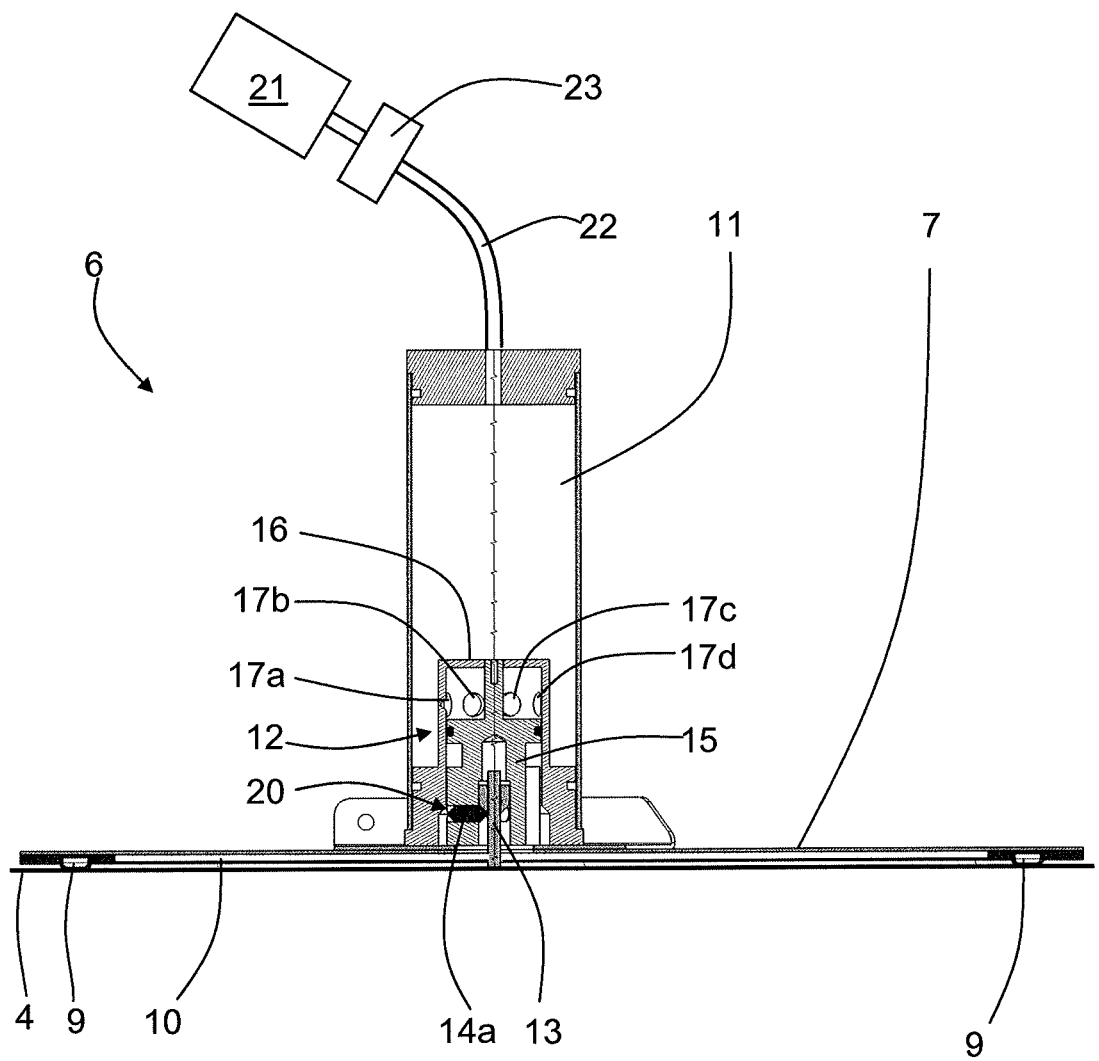
FIG. 9 shows a sectional side view of the vehicle braking arrangement when the piston is unlocked.

In FIG. 9, due to the pressure in the low pressure container 11 falling below the pressure in the volume 10, the piston 15 is urged towards the low pressure container 11. Due to wedges in the locking pins 14a, 14b, 14c, 14d, and the wedged shape of the shoulder edge 20, the locking pins 14a, 14b, 14c, 14d are pushed away from the housing 16, into the apertures 19a, 19b in the cylinder 15, by means of the cylinder's movement, the locking pins 14a, 14b, 14c, 14d no longer being blocked by the trigger pin 13. This means that the initial movement of the cylinder 15 performs an unlocking of the cylinder 15 itself relative the housing 16.

Figure 10:
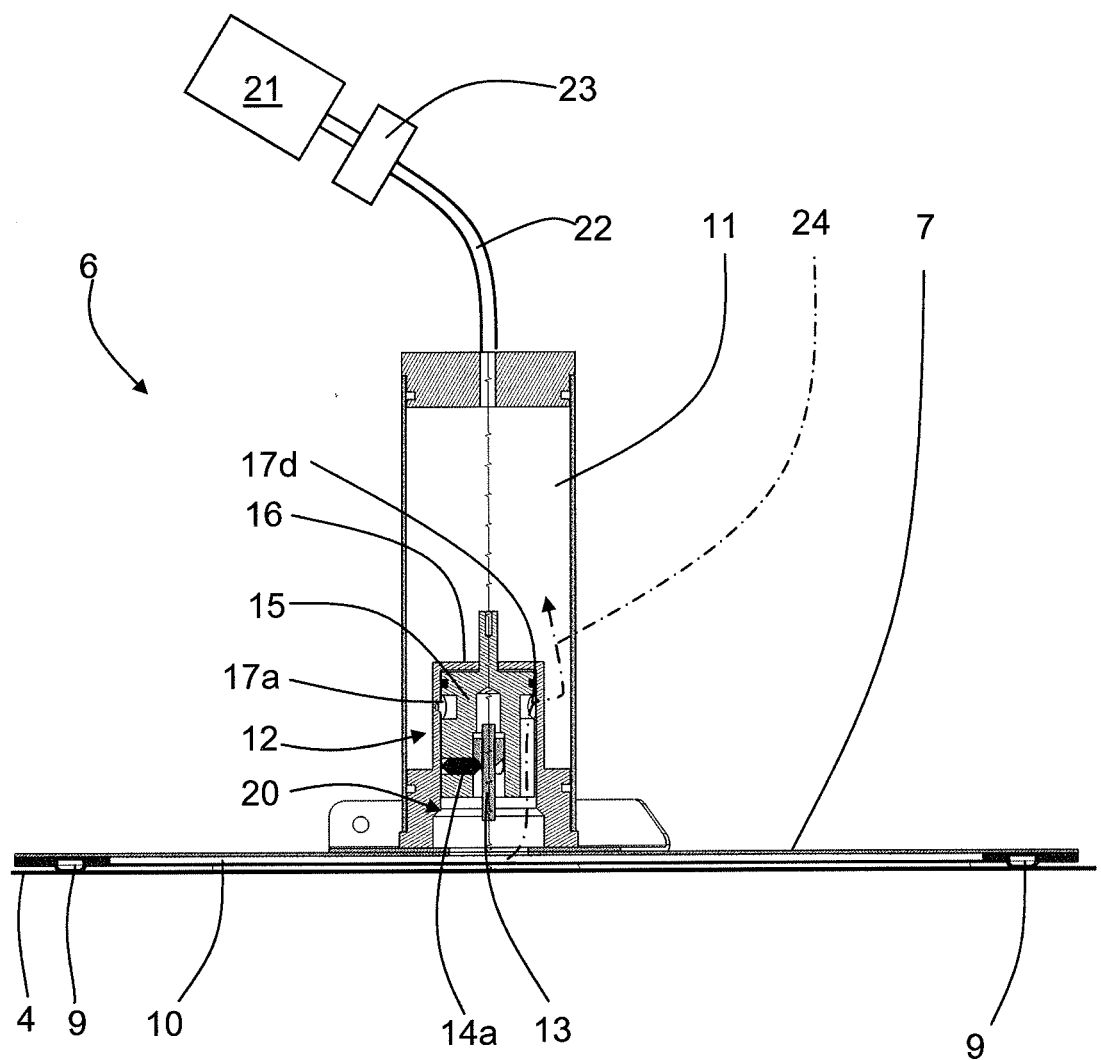
FIG. 10 shows a sectional side view of the vehicle braking arrangement when the valve assembly is opened.

As shown in FIG. 10, the cylinder 15 has moved to such a position that there now is a fluid connection from the volume 10 to the low pressure container 11, air now being evacuated from the volume 10 to the low pressure container 11 via the apertures 17a, 17b, 17c, 17d, for example as indicated with a dash-dotted air flow arrow 24. As an effect of this, the pressure in the volume is lowered relative the air surrounding the braking plate 7, the braking plate 7 being pressed towards the ground 4. The retaining force is dependent of the magnitude of pressure drop, as well as of the sealing properties of the sealing rim 9.

The steps above with reference to FIG. 6, FIG. 7, FIG. 9 and FIG. 10 are performed very rapidly, roughly within 100 milliseconds.

By means of this arrangement, a secure and almost instant opening of the valve assembly 12 when the braking plate 7 hits the ground 4 is obtained. Due to the relative short time of braking effect, the timing of when opening the valve assembly 12 is critical for the function of the brake.

Other types of valve arrangements are of course conceivable, the one described only being an example. For example, a pyrotechnical charge may be arranged to open a valve element when the braking plate 7 hits the ground 4.

Furthermore, as shown in FIG. 6, FIG. 7, FIG. 9 and FIG. 10, the low pressure container 11 may alternatively be connected to a supporting arrangement 21 for maintaining a low pressure after an at least partial pressurization of the low pressure container 11. The low pressure container 11 is connected to the supporting arrangement 21 by means of a pipe 22, hose or similar, via a suitable valve arrangement 23. The supporting arrangement 21 is only shown schematically as a box, and may be constituted in a number of ways. A number of examples follow below.

A supporting arrangement 21 may be constituted by one or several auxiliary low pressure containers which suitably are connected one at a time or in any other suitable previously configured manner. One or several valves are used for such an arrangement, said valve being controlled by for example pressure levels and/or electrical signals. Another example of a supporting arrangement 21 is an existing low pressure source in the vehicle, suitably a brake system of a vehicle with a vacuum brake system, such as a truck. The use of an existing low pressure source in the vehicle requires that the low pressure source is connected to the low pressure container 11 via a valve arrangement 23 that suitably is in the form of a one-way valve.

Yet another example is a pyrotechnical charge that creates a low pressure, suitably by acting on a so-called Venturi tube.

A combination of the several supporting arrangements according to the above is also conceivable.

The low pressure container 11 does not have to arranged on the braking plate 7, but may be arranged at any suitable position in the vehicle, and be connected to the braking plate 7 via a pipe, hose or similar, via a suitable valve arrangement.

The invention is not limited to the examples above, but may vary freely within the scope of the appended claims. For example, the rapid displacement of the braking plate 7 to the braking position may be accomplished in many ways, with or without the use of a spring device 18, for example by means of a pyrotechnical charge acting on a suitable arrangement on the link arm 8.

Many details on the drawings are not discussed in detail, for example how the link arm 8 is constituted, the functionality and suitable forms all such details and arrangements being easily understood by the skilled person.

There may be any suitable number of locking pins and apertures in the housing 16, but at least one of each.

The emergency braking system 6 is generally constituted by a vehicle braking arrangement.

The low pressure container 11 may be equipped with a pressure detector or pressure meter, which for example is arranged to indicate the air pressure in the low pressure container 11, or, alternatively, only whether the air pressure in the low pressure container 11 is below a certain predetermined pressure level or not.

The low pressure container 11 could be regularly checked by means of such a pressure detector or pressure meter, and, if needed, its pressure could be lowered. However, the low pressure container 11 is preferably constituted by a separate part that is sealed and normally does not require any additional lowering of its pressure.

As an alternative, the low pressure container 11 may be connected to an arrangement in the vehicle that is arranged to maintain the air pressure in the low pressure container 11 below a certain predetermined pressure level.

The invention claimed is:

1. A vehicle braking arrangement comprising:
    a braking plate movable from a rest position with a certain ground clearance to a braking position for contact with the ground, the braking plate including a sealing rim running circumferentially and arranged to at least partially contact the ground in the braking position such that an at least partly enclosed volume then is formed between the braking plate and the ground; and
    a low pressure container carried by the braking plate for movement therewith and fluidly connected to the volume via a valve assembly, where an air pressure in the low pressure container is below an air pressure of ambient air when the braking plate is in the rest position, the valve assembly arranged to be opened when the braking plate is in the braking position such that air pressure is lowered in the at least partly enclosed volume and the braking plate is pressed against the ground by a conferred pressure difference between air outside the at least partly enclosed volume and air in the at least partly enclosed volume such that a retaining force between the braking plate and the ground is obtained;
    wherein the valve assembly is disposed in the low pressure container and carried by the braking plate.

2. The vehicle braking arrangement according to claim 1, wherein the low pressure container is connected to a supporting arrangement for maintaining a low pressure after an at least partial pressurization of the low pressure container.

3. The vehicle braking arrangement according to claim 2, wherein the supporting arrangement includes at least one of:
    at least one auxiliary low pressure container;
    a low pressure source in the vehicle; and
    a pyrotechnical charge acting on a Venturi tube.

4. The vehicle braking arrangement according to claim 3, wherein the low pressure source in the vehicle is constituted by a brake system of the vehicle.

5. The vehicle braking arrangement according to claim 2, wherein the low pressure container is connected to the supporting arrangement via a one-way valve.

6. The vehicle braking arrangement according to claim 1, in combination with the vehicle.

7. A vehicle braking arrangement comprising:
    a braking plate movable from a rest position with a certain ground clearance to a braking position for contact with the ground, the braking plate including a sealing rim running circumferentially and arranged to at least partially contact the ground in the braking position such that an at least partly enclosed volume then is formed between the braking plate and the ground;
    a link arrangement arranged to connect the braking plate to a vehicle;
    a low pressure container fluidly connected to the volume via a valve assembly, where an air pressure in the low pressure container is below an air pressure of ambient air when the braking plate is in the rest position, the valve assembly arranged to be opened when the braking plate is in the braking position such that air pressure is lowered in the at least partly enclosed volume and the braking plate is pressed against the ground by a conferred pressure difference between air outside the at least partly enclosed volume and air in the at least partly enclosed volume such that a retaining force between the braking plate and the ground is obtained,
    wherein the valve assembly includes a trigger pin, at least one locking pin, a piston and a housing, the piston being co-axially arranged in the housing, wherein the housing includes at least one aperture that connects the low pressure container to an interior of the housing, the piston being locked in sealing engagement with the housing by the locking pin, the trigger pin being arranged to release the piston by acting on said locking pin when the trigger pin is pressed against the ground, the released piston allowing a fluid connection between the at least partly enclosed volume and the low pressure container to be established.

8. A method of braking a vehicle, the method comprising:
    providing a braking arrangement including a braking plate connected to the vehicle via a link arrangement and a low pressure container carried by the braking plate, the braking plate movable from a rest position with a certain ground clearance to a braking position, the braking plate including a circumferentially extending sealing rim arranged to at least partially contact the ground in the braking position such that an at least partly enclosed volume then is formed between the braking plate and the ground, the braking arrangement further including a low pressure container fluidly connected to the volume via a valve assembly, the valve assembly disposed in the low pressure container, where an air pressure in the low pressure container is below an air pressure of ambient air when the braking plate is in the rest position;
monitoring the low pressure container to the braking plate;
moving the braking plate from the rest position to the braking position such that the low pressure container is moved with the braking plate; and
opening the valve assembly when the braking plate is in the braking position such that air pressure is lowered in the at least partially enclosed volume and the braking plate is pressed against the ground by a conferred pressure difference between air outside the at least partly enclosed volume and air in the at least partly enclosed volume such that a retaining force between the braking plate and the ground is obtained.

* * * * *